C. BULLOCK.
Mowing Machine.
No. 28,628.
2 Sheets—Sheet 2.
Patented June 5, 1860.
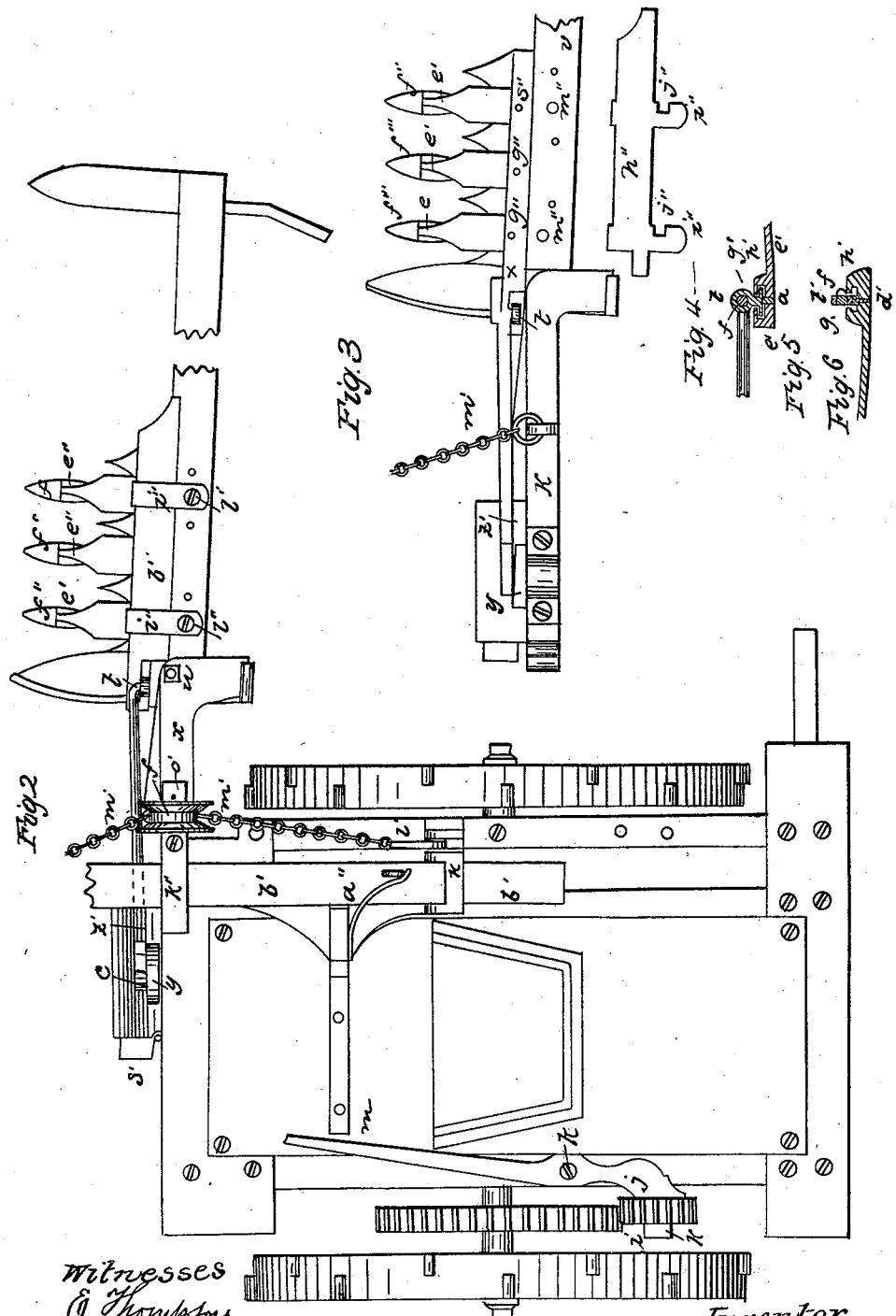

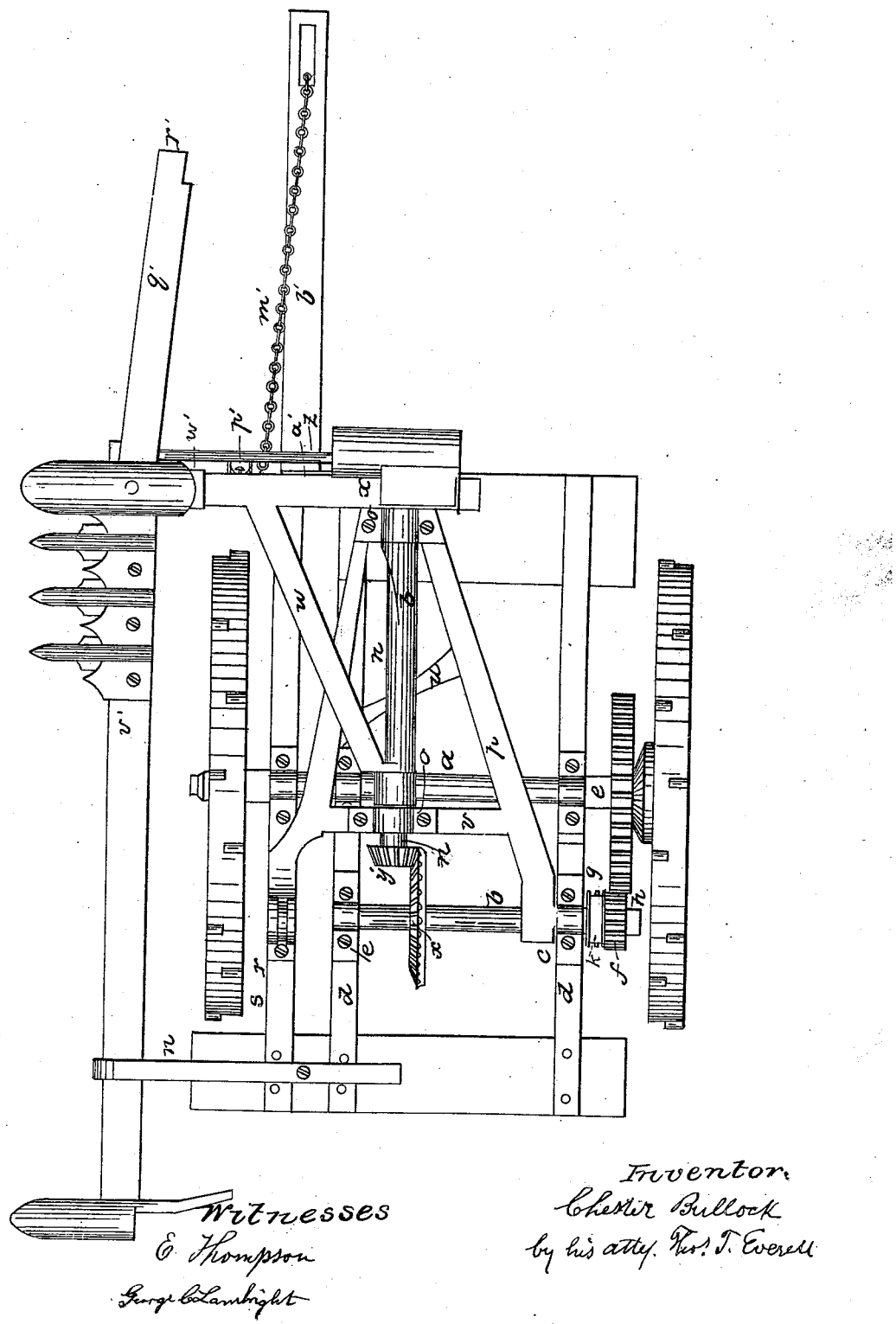

UNITED STATES PATENT OFFICE.

CHESTER BULLOCK, OF JAMESTOWN, NEW YORK, ASSIGNOR TO HIMSELF AND DE FOREST WELD, OF SAME PLACE.

IMPROVEMENT IN MOWING-MACHINES.

Specification forming part of Letters Patent No. 28,628, dated June 5, 1860.

*To all whom it may concern:*

Be it known that I, CHESTER BULLOCK, of Jamestown, in the county of Chautauqua and State of New York, have invented certain new and useful Improvements on Mowing-Machines; and I do hereby declare that the following is a full, clear, and exact description of the construction and operation of the same, reference being had to the accompanying drawings, and to the letters and marks thereon.

Of the drawings forming part of this specification, Figure 1 is a bottom or under side view of a mowing-machine having my improvements, the finger-bar and cutter-bar attached thereto being held up by the side of the body or frame of the mower. Fig. 2 is a top view, or a view of the upper side, of such machine, with the finger-bar and cutter-bar extended out, in its operative position, a portion of the finger-bar shown removed. Fig. 3 is a top view of a portion of the finger-bar and cutter-bar and of the means attached to them, showing the manner of attaching the base of the cutters to the cutter-bar, the top or clamping piece for keeping cutters and cutter-bar in place being represented separate and detached by Fig. 4. Fig. 5 is a longitudinal sectional view of the inner portion of the cutter-bar, showing the swivel-joint uniting it to the connecting-rod; and Fig. 6 is a sectional view of the same parts, as shown when the bars are held up by the side of the mower-frame, as represented by Fig. 1.

In each of these figures the same parts are indicated by the same marks and letters.

As parts of this mowing-machine are of common use, I will only describe such as are of my invention, or so connected with those parts as that description of or reference to them is necessary.

The first part of my invention relates to an arrangement of means for connecting the frame or bars of the fingers and cutters to the frame or body of the mower.

The second part of my invention relates to an arrangement of means for suspending the frame or bars of the fingers and cutters by the side of the mower frame or body.

The third part of my invention relates to means for uniting the cutter-bar to the connecting-rod.

The fourth part of my invention relates to the means for connecting the draft-pole with the frame of the machine and with the frames that are attached to the cutter and finger bars.

The fifth part of my invention relates to the manner of attaching the cutters to the fingers and to the cutter-bar.

The first part of my invention is thus carried out: I place behind the axle or main shaft $a$ of the machine a shaft, $b$, supported by suitable bearings, $c$, which are affixed to the bars $d$ of the machine. This shaft $b$ derives its motion from shaft A through the medium of geared or toothed wheel $e$ upon shaft $a$, and pinion $f$, attached to a collar, $g$, around shaft $b$, pinion $f$ being in communication or gear with wheel $e$ or not, as pins $h$ on the end of shaft $b$ are in recesses $i$ in the side of pinion $f$ or not, the means for putting in or out of gear the wheel and the pinion being a lever, $j$, the forked end of which embraces the collar $g$ at $k$, its fulcrum being at $l$, and its front end, $m$, having a pin to fit into a hole in one of the bars of the frame. At right angles to shafts $a$ and $b$, I place a third shaft, $n$, in bearings $o$ of a hinged or vibrating frame, one of the side bars, $p$, of which embraces shaft $b$, and the other side bar, $q$, being hinged to a plate, $r$, with a part of a hinge to side bar, $s$, of the frame of the mower. A portion of this frame of the third shaft, $n$, is half-tubular, $t$, and covers one side of the shaft, while other portions are strengthening-bar $u$, a bearing-bar, $v$, and a connecting-bar, $w$. The front end of shaft $n$ passes through a bearing on bar $x$, and has at this end a disk, $y$, secured to it, having a crank-pin, $z$, to which one end of the connecting-rod $z'$ is attached. The inner end of shaft $n$ has a beveled pinion, $y'$, which gears into the beveled wheel $x'$ on the shaft $b$, and through this gearing shaft $n$ derives its motion. Bar $x$ is connected to bar $w$, and extends in a line at right angles to the shaft $n$ out to the embracing shoe-bar $w'$ on the finger-bar $v'$. A pin, $u'$, passing through the outer end of bar $x$, shoe-bar $w'$, and finger-bar $v'$, attaches these bars at this point and forms a pivot upon which the finger-bar turns. The cutter-bar is connected to shaft $n$ by the rod $z'$, the outer end of which is bent and turned into the swivel $t'$, the point or pin of the swivel passing through the cutter-bar, and thus, in conjunction with the pin $u'$, completing the connection between the frame or bars of the cutters and fingers and the frame or body of the mower. By this arrangement of means the finger-bar, with the cutter-bar, is susceptible of being raised or lowered as a whole, or the outer end of the finger-bar being raised, while the bars will continue in the same relative position to the connecting at all positions, and the cutters can be kept in motion also at all positions or inclinations.

In carrying out the second part of my invention facility is afforded by the attachment of the frame of the third shaft, $n$, to the shaft $b$ and to the bar $s$, and by the movement of the bar $x$ upon the end of the shaft $n$; but the means more particularly involved under this part of the invention are the following: the joint attaching the bar $x$ to the finger-bar, that which attaches the connecting-rod to the cutter-bar, the clamping-band $s'$ at the inner end of bar $x$, which, when the extended part $q'$ of the finger-bar $v'$ is underneath the bar $x$, fits upon the notched end $r'$ and keeps this end of the finger-bar steady, the roller $p'$ on a small shaft, $o'$, affixed to the box of the draft-pole, and the bracket $n'$ at the rear part of the mower-frame. It will readily be seen how by these means the finger-bar and cutter-bar are permitted to be moved from their operative position to that position where they are safely kept by the side of the mower when it is transported or moved from one locality to another. The use of all of the means named for this purpose will clearly be seen when taken in connection with the use of the chain $m'$, extending from the outer end of the draft-pole to a lever, $l'$, pivoted to the rear box, $k'$, of the draft-pole, and which chain, when the back end of the finger-bar rests upon the bracket $n'$, is passed around the roller $p'$, and supports the front end of the cutter and finger bars by passing through a ring, $j'$, attached to a stud, $i'$, of the bar $x$.

The means used for uniting the cutter-bar to the connecting-rod, which constitute the third part of my invention, are more specially shown in Figs. 5 and 6. From an examination of these figures it will be perceived that the inner end of the cutter-bar is thickened, and that through this thickened part a horizontal slit, $h'$, is made, and also a vertical slit, $g'$, while a hole is also made throught that part which lies below the horizontal slit. A swivel of a peculiar form is fitted to the cutter-bar by means of the hole and the slits, and is made the means, in connection with them, for attaching the connecting rod and the cutter-bar, and of allowing of all the motions necessary to the full use of these bars, whether in operation or at rest. This swivel has an eye, $f'$, into which fits the bent end of the connecting-rod, a body, from both sides of which lips $e'$ extend, and a continuation downward, $d'$, which fits into the hole of the cutter-bar. The part $d'$ fitting in the hole readily turns therein, though its end is hammered down, so as to be kept in the hole. The lips move within the horizontal slit and the body immediately below the eye in the vertical slit. When the bar is in position for use the lips of the swivel lie under the lips of the bar, as shown by Fig. 5, and aid in strenghtening this end of the bar; but when the bars are held up by the side of the mower-frame they lie in line with the slit and allow of easy motion of this end of the bar.

The draft-pole $b'$, named as within the fourth part of my invention, is not rigidly connected to the frame of the mower or the machine, but is only fitted into boxes $k'$ $k''$, within which it has longitudinal movement. A stud or projection on its under side at $a'$ limits its backward or inward movement, and a spring-catch, $a''$, resting against an eye, $b''$, assists the stud, while it also aids in the forward motion of the pole. When the cutter-bar is in use the chain $m'$ is not passed over the roller $p'$, but after passing through the eye $j'$ goes direct to the lever $l'$, the upper end of which lever is within reach of the driver's hand, and may be used by him to raise or lower the frame of the finger and cutter bars. Through this arrangement of the chain and pole the side draft of the cutter and finger bars and frame is entirely relieved. When the cutter and finger bars and frame are held up by the side of the mower or machine frame the chain $m'$ is passed around the roller $p'$, and thus the weight transferred from the end of the pole to the side of the machine-frame.

The manner of attaching the cutters to the fingers and to the cutter-bar, which forms the fifth part of my invention, is shown by Figs. 2, 3, and 4. The points of the cutters $e''$ are placed in recesses in the base of the finger-caps $f''$, and have some play therein. At their rear ends the cutters have a pin, $g''$, which fits into a hole in the cutter-bar $x$. The finger-bar $v'$ is recessed for the cutter-bar, and also for a clamping-bar, $h''$, and, as shown by Fig. 4, the clamping-bar has arms $i''$ with slits $j''$, and by screws $l''$, passing through these slits into holes in the finger-bar at $m''$, the clamping-bar is secured to the finger-bar, overlying the cutter-bar and allowing it free motion underneath. The drawings show the clamping-bar extending over the base of three cutters only; but, as is evident, it may extend over the entire number of cutters to the extreme ends of the fingers; or it may pass over only a few cutters, there being several clamping-bars over the series of cutters and between the inner and outer ends of the finger-bar. This manner of securing the cutters to the fingers and to the cutter-bar allows them to have a drawing cut upon the grass or grain, as the point of the cutter by the movement of the cutter-bar will have an in-and-out motion in the recess of the finger.

While this machine can be used for any and all purposes for which mowers are generally used, the arrangement and construction of certain parts of it will allow its use with great efficiency as a hedge-trimmer. The tongue and cutter-bar, it will be perceived, having an unusual range within which they can be moved, gives to this machine the facility and ease of movement to the cutter-bar, which is uncommon, and by elevating the cutter-bar to about forty-five degrees the machine can be operated as a very valuable and successful hedge-trimmer.

What I claim as my invention, and desire to secure by Letters Patent, is—

1. The arrangement of means herein recited for connecting the frame or bars of the fingers and cutters to the frame or body of the mower or machine.

2. The arrangement of means set forth for allowing of the suspension and for suspending the frame of the cutters and fingers by the side of the mower.

3. The means recited for uniting the cutter bar to the connecting-rod.

4. The arrangement of means described for connecting the draft-pole to the mower or machine frame, and for the purposes set forth.

5. The manner of attaching the cutters to the fingers and cutter-bar described.

CHESTER BULLOCK.

Witnesses:
W. R. ANDREWS,
WM. A. KEELER.